United States Patent [19]

Jahns

[11] Patent Number: 4,703,844

[45] Date of Patent: Nov. 3, 1987

[54] CONVEYER SYSTEM WITH BRANCHING FACILITY

[75] Inventor: Werner Jahns, Seligenstadt, Fed. Rep. of Germany

[73] Assignee: Mannesmann Ag, Duesseldorf, Fed. Rep. of Germany

[21] Appl. No.: 804,805

[22] Filed: Dec. 4, 1985

[30] Foreign Application Priority Data

Dec. 21, 1984 [DE] Fed. Rep. of Germany ....... 3446805

[51] Int. Cl.$^4$ .......................................... B65G 47/46
[52] U.S. Cl. ................................... 198/367; 198/365; 198/362; 198/437
[58] Field of Search ............... 198/367, 366, 436, 365, 198/437, 358, 370, 362, 586, 597, 601, 599, 782, 784; 193/35 MD, 36

[56] References Cited

U.S. PATENT DOCUMENTS

| | | | |
|---|---|---|---|
| 3,138,238 | 6/1964 | De Good et al. | 198/362 |
| 3,219,166 | 11/1965 | Collins et al. | 198/362 |
| 3,241,651 | 3/1966 | Colby | 198/437 |
| 3,983,988 | 10/1976 | Maxted et al. | 198/365 |
| 4,328,889 | 5/1982 | Maxted | 198/367 |

Primary Examiner—James B. Marbert
Attorney, Agent, or Firm—Ralf H. Siegemund

[57] ABSTRACT

A principal or main conveyer cooperates with branch conveyers in that diverting wheels are provided for pivoting to the left or right as well as for lowering and raising, for obtaining selectivity of diverting.

11 Claims, 9 Drawing Figures

CONVEYER SYSTEM WITH BRANCHING FACILITY

BACKGROUND OF THE INVENTION

The present invention relates to a conveyer facility with a principal conveyer and branching or diverting conveyers provided for purposes of sorting and selective diversion, there being gates or gatelike structure associated with these diverting branches.

U.S. Pat. No. 4,328,889 discloses a conveyer facility of the type to which the invention pertains and including a primary and secondary conveyers; it discloses also a structure wherein diverting wheels are diposed to branch off articles in one particular direction and it is not possible to provide secondary or branching conveyers in positions being oppositely located as far as the main or principal or primary conveyer is concerned. However two-sided branching is often quite desirable.

DESCRIPTION OF THE INVENTION

It is an object of the present invention to provide a new and improved conveyer facility having a main or primary conveyer, and branch diverting or secondary conveyers such that so to speak branching can occur from the same location as far as the main or primary conveyer is concerned either to the left or to the right.

In accordance with the preferred embodiment of the present invention it is suggested to provide a gating structure with wheels which are provided with horizontal axes of rotation and pivotable shafts which (a) pivot the axes of rotation in a horizontal plane and (b) can be lowered or raised in suitable guides and mounting structures. These pivot shafts are provided with lever arms extending in the direction of the primary or principal conveyer either in forward or backward direction. If more than one wheel shaft arrangement is provided all the respective lever arms are connected to a common coupling rod which can be shifted transversely to the direction of operation of the principal or primary conveyer. Moreover, the wheel mounting structure (shafts) is broadly speaking provided with a cam-feeler structure cooperating with a stationary cam structure having a concave contour to establish a low point in the center and lifting positions to either side sufficient for lifting the wheels above the conveyer plane of the primary conveyer so as to divert guiding pieces of freight and articles from the primary conveyer. Conveniently, the cam operation for lifting may involve also the pivot lever (levers) by means of which the respective shaft is turned to turn the diverting sheel towards the right branch and the left branch. The wheels are thus lifted to that extent so that the piece of freight can be guided towards the particular desired branch and diverting conveyer; the latter may be provided with a follower roller at the point of connection to the principal or primary conveyer. The follower roller may also project somewhat beyond the primary conveyer and should be provided with a (frictional) high surface resistance. The follower roller will guide a piece of freight in the branch or diverting conveyer whenever the particular article was in fact diverted from the main conveyer by means of the diverting wheels towards the particular branch conveyer line.

In furtherance of the invention the lever arms have the various pivot shafts bear by means of cams against cooperating cams whereby the cams are spherical balls or suitably sliding on the cooperating cams. Instead one may use guide grooves cooperating with pins projecting from the front of the particular lever arms. In case the above mentioned coupling rod has sufficient strength it is sufficient if the lever arm of the outer gate disks bear on cams. Those situated in between can then bear on the coupling rod by means of the lever arms of the pivot shafts.

The coupling rod in accordance with a further feature of the invention is connected through a follower pin to an operating lever constructed as a triangle, the pin constituting one corner of that triangle. This lever is mounted by means of a vertical bearing pin next to the pivot shafts and in a suitable mounting structure, thus being the second corner of the triangle, and the third corner is a connection of the lever to a piston rod or an actuator drive and motor. This motor has a longitudinal shaft arranged parallel to the main or primary conveyer by a half way position of the rod bearing pin and follower pin of the actuating lever, the pivot shafts and the coupling rod establish a rectangle. In the case of full retraction or extension of the piston rod, this rectangle is, so to speak, distorted to assume a parallelogram position whereby all cams undergo a arc shaped movement for lifting the diverting wheels. The direction of parallelogram orientation establishes the direction of diverting.

It should be noted, that at the point of diverting, the principal conveyer belt may be downwardly looped to establish a suitable space for the diverting structure. The various gate wheels are driven from the conveyer itself whereby deflecting wheels are drivingly coupled to the conveyer drive by means of an elastic belt. On lifting of a wheel this belt is tensioned.

A single diverting wheel may be arranged next to the main conveyer and suffices as far as opeation is concerned whenever the freight is of variety that extends beyond the principal conveyer belts on the side from which the particular diverting branch extends. After diversion the freight will be taken up by a follower roller out of the main conveyer. The principal conveyer could be divided into two strips arranged side by side and in between diverting wheels are arranged which can be pivoted in one or the opposite direction. In all instances these wheels may well be supported in their diverting action by overhead friction wheels and having a diverting direction which is the same as the one of the respective diverting wheels below. The diverting wheels are preferably spring biased so that differences in thickness among the various pieces of freight can be compensated.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 2:
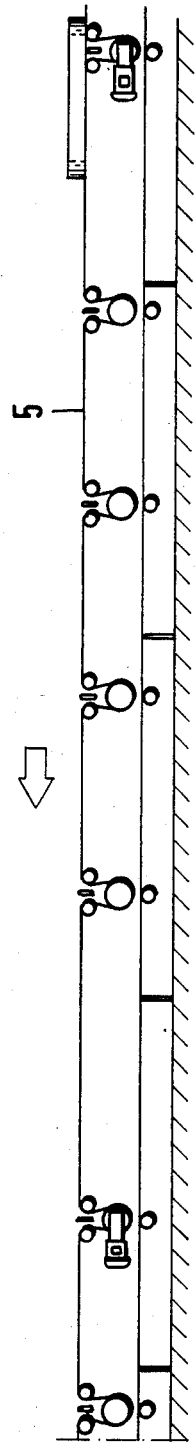
FIG. 2 is a side view of FIG. 1.
Figure 1:
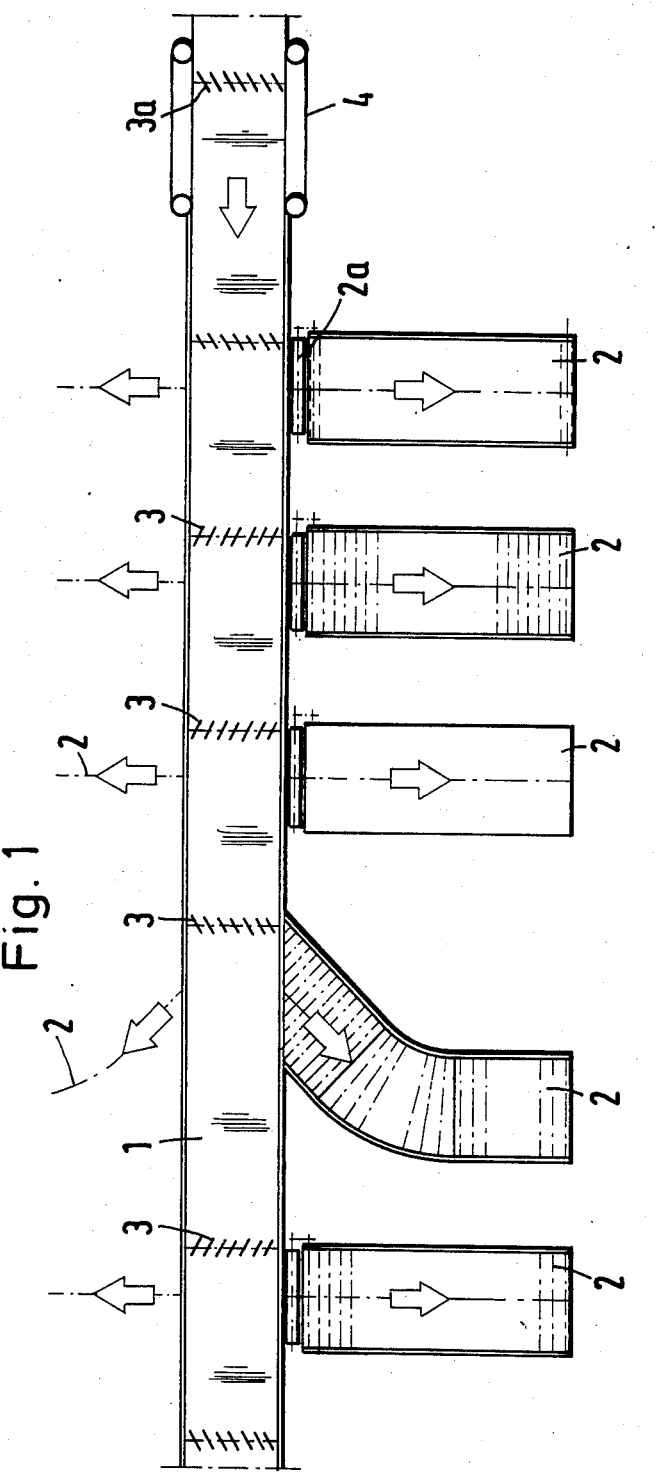
FIG. 1 is a top elevation of a portion of a conveyer system which includes the features of the invention in accordance with the preferred embodiment for practicing the best mode thereof.

Proceeding now to the detailed description of the drawings reference is made specifically to FIGS. 1 and 2 which illustrate a principal main or primary conveyer 1 with diverting branches arranged to both sides. The branches are shown in detail only on one side while arrows on the other side indicate analogous and similar branches. It can be seen that these diverting branches or secondary conveyers are arranged in pairs along the principal or main conveyer 1 and the secondary conveyers branch off the principal conveyer from particular points but in opposite directions. Depending upon the type of freight or articles to be branched off, a particular branch may have at its entrance a follower roller 2a being in fact interposed between the main or primary conveyer and the respective branch or secondary conveyer. The particular roller 2a has a surface with a very high friction and may project somewhat beyond the conveyer plane as defined by the conveyer belt 5 of the principal conveyer 1.

Diverting wheels 3 are associated with each branch conveyer right at the point of branching. These diverting wheels 3 serve as gates as well as moving facilities for branching and diverting an article or a piece of freight off the primary conveyer and into one or the other branch that follows immediately to the left or to the right of the primary conveyer. These wheels 3 can be lifted and lowered. A particular set of diverting wheels 3a is arranged between moving, conveyer beltlike sides 4 at the beginning of the primary conveyer. Wheels 3a are provided for presorting the goods to be conveyed and to shift a piece of freight towards one or the other beltlike sides 4; i.e. to the left or to the right edge of the main or primary conveyer belt 5 depending on whether branch direction to the left or to the right is to be expected.

Figure 3:
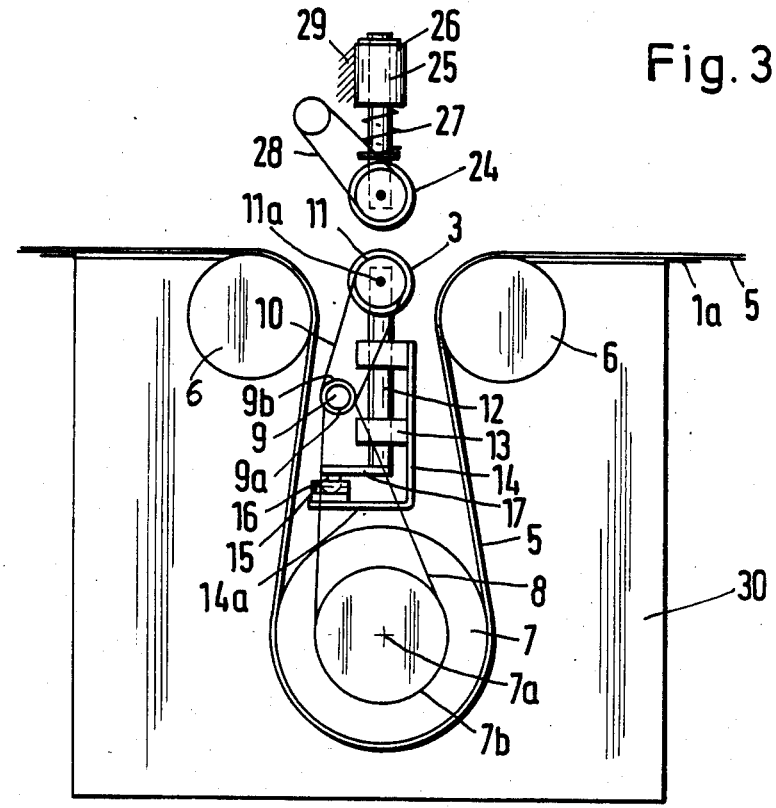
FIG. 3 is a detail of the view shown in FIG. 2 but on an enlarged scale.
Figure 4:
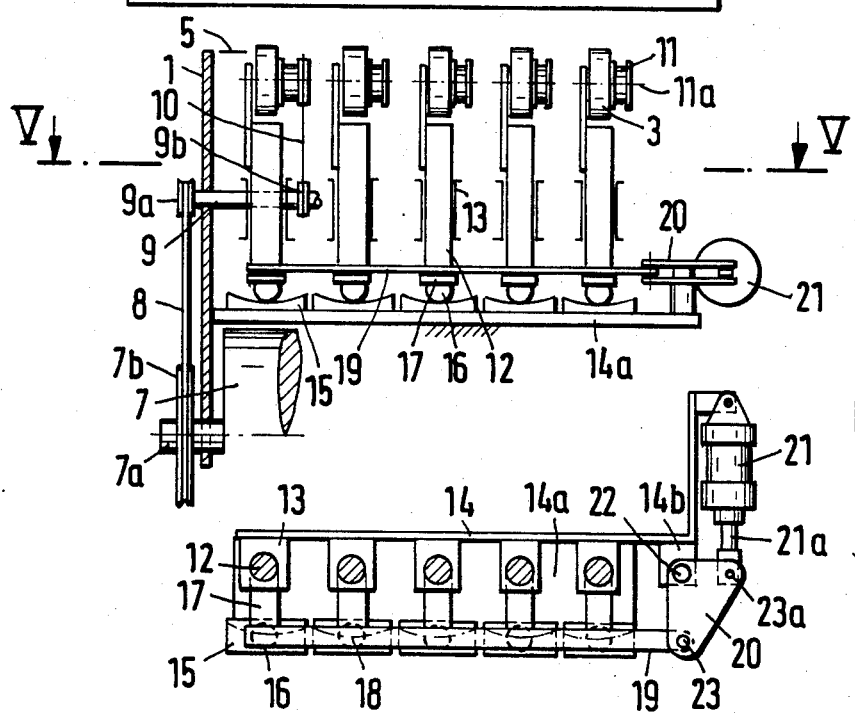
FIG. 4 is a side view of a diverting wheel support and pivot structure as shown otherwise in FIG. 3.

As shown in FIG. 3 the main or primary conveyer 1 is provided with carrier plates 1a for the conveyer belt 5 and the conveyer belt itself actually bypasses in down direction each set of diverting wheels 3 through deflection rollers 6 and 7. The lower deflection roller 7 is provided with a shaft 7a which in turn carries a driving disc or wheel 7b being basically arranged next to the primary conveyer 1 (see FIG. 4) and engaging an elastic drive belt 8. This belt 8 drives a shaft 9 through a wheel 9a. Several discs 9b are arranged on that shaft 9 (only one being shown) for purposes of driving the wheels 11 via belts 10. Each of these wheels 11 is associated with and drives diverting wheels 3 (or 3a) and each of these wheels is provided with a shaft 11a accordingly.

A pivot and mounting shaft 12 is associated with each of the wheels 3 permitting pivoting of the wheels about vertical axes without changing horizontality of the rotating axes of the diverting wheels. The shafts 12 in turn can be lifted or lowered to thereby lift and lower the respective wheel 3. The shafts 12 are particularly mounted in bearings 13 combined in a common mounting structure 14. The mounting structure 14 in turn is associated to a principal mounting structure 30 that is common and part of the principal conveyer system at that particular point.

The bearing carrier 14 in each instance has a horizontal support arm 14a for a cam structure 15. Cam feelers 16 bear against the stationary concave cams 15 by means of levers 17 which in each instance is connected for pivoting of the respective pivot shaft 12. This is shown in greater detail in FIGS. 3 and 4. Thus, each vertical shaft or post 12 has a horizontal lever 17 by means of which the shaft 12 can be turned or pivoted on an axis. Also, the cam structure 15/16 lowers or raises the lever 17 to thereby lower and raise the post or shaft 12 and the respective diverting wheel 3 it carries.

Figure 9:
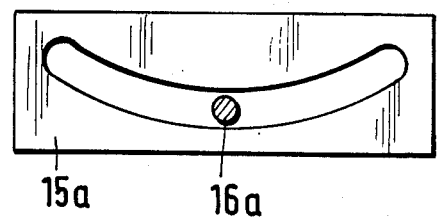
FIG. 9 is a representative example for an alternative cam actuation used in any of the systems of the preceding figures.

The parts to be lowered and lifted should generally be of low weight in order to avoid moving undue heavy masses. This may entail that the weight is not always sufficient for a part to drop to its lowermost position which it can assume. In this case the bearing and cam structure 15/16 may be constructed as shown in FIG. 9 wherein a guide groove 15a for a cam pin 16 is provided; the function is the same as cam structure 15 and 16 in FIGS. 3, 4 and 5. The cams 16 are shown as cap nuts on pins 18.

Figure 5:
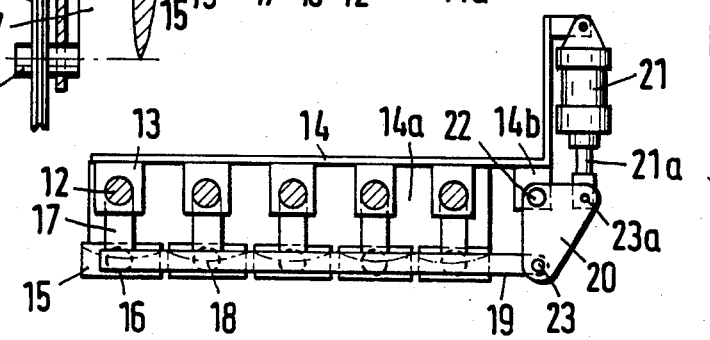
FIG. 5 is a section view as indicated by V—V through FIG. 4.

All lever arms 17 are connected to a coupling rod 19 which pivots all levers 17 in unison and indirectly, through cams 15/16 causes levers 17 and shafts 12 to be lifted when the cams 16 leave their lowermost position in concave cams 16. The coupling rod as shown in FIG. 5 is connected by means of a follower pin 23 with a lever 20. Lever 20 is pivotably mounted by means of a bearing pin 22 engaging an eye 14b of the carrier 14. Lever 20 is further connected by means of a follower pin 23a to the piston rod 21a of adjusting and actuating motor 21. The motor 21 may be hydraulic or solenoidal type motor.

It can thus be seen that the carrier 14 and the coupling rod 19 in FIG. 5 constitute the long size of a rectangle, the short sides are established respectively by the leftmost lever arm 17 and by the operating lever 20 as linked with the mount 14b. This rectangle will be distorted and becomes a parallelogram whenever lever 20 pivots in the drawing clockwise or counterclockwise dependent upon the protraction or retraction of piston rod 21a from the medium position as illustrated.

FIG. 5 shows the drive 21 in a position in which the piston 21a is half way in between two terminal positions. The terminal positions being defined by full retraction or full protraction. In either case upon deviating from the illustrated position the motor 21 will cause the lever 20 to pivot around pivot point 22 so that the coupling rod 19 will be displaced through the follower pin 23 and in FIG. 5 either to the left or to the right.

The various cam feelers 16 as connected to the coupling rod 19 in a manner described above, will assume the middle position if the piston rod 21a has the halfway position. This position corresponds to a minimal or lowermost position of the feelers 16 vis-a-vis the stationary concave cams 15. If the rod 21a is pushed out or fully retracted feelers 16 on lever elements 17, and the levers themselves together with posts or shafts 12 and diverting wheels 3, will be lifted, while the wheels 3 are pivoted for right hand or left hand diverting. This, however, is to be understood only with reference to this particular figure. In other words as a consequence of this movement initiated by the operating arm 19 of motor 21 the pivots shafts 12 will be turned in one way or the other so that the wheels 3 are pivoted on a vertical axis in each instance. In addition the wheel 3 will be lifted above the plane of element 5 which is a result of the fact that upon pivoting lever 20 about pivot point 22 the motion of pivot 23 is not linear along the extension of piston or actuator rod 21a but perpendicularly thereto.

As the motor 21 causes the piston rod 21a to be pulled back or pushed out the wheels 3 are lifted above the conveyer plane 5 and therefore into the path of conveying of any goods transported by the belt 5 along the direction of principal conveyer 1. In addition and depending on the direction of actuation by the motor 21, the wheels 3 will be turned in one or the opposite direction to thereby direct and divert any goods arriving at the particular point to be moved to the left or to the right vis-a-vis the principal direction of conveying of main conveyer 1. Following this lateral deflection of the goods, the goods may be captured by the follower drum or roller 2a if such is provided in front of the respective branch conveyer.

This is the principal branching operation to be carried with the equipment shown and described thus far. It can readily be seen, however, that in certain instances it may be advisable to adapt the whole conveyer facility so that the type of articles that are being conveyed in order to make the conveyer safer and the branching more suitable to the occasion. If flat goods or articles are to be transported such as newspapers, thin sheet stock, wooden lamina or the like. Certain hold down facilities may be needed which is the purpose of the optional equipment shown also in FIG. 3 and including overhead friction wheels 24. These wheels are mounted on shafts 25 which in turn are held in sleeves 26. Springs 27 provide axial bias of the wheels 24 in down direction. The wheels 24 may in addition be connected to a drive which is not shown as such, but a belt 28 is illustrated in order to shown the rotational movement upon the wheels 24. The shafts 25 may be axially displaceable inside sleeves 26. The sleeves 26 in turn are mounted on a carrier 29. The purpose of this arrangement is that particularly the friction disc 24 being resiliently mounted prevents any flat and thin article from jumping up, being pushed up or from any other vertical movement which in some form is derived from the kinetic energy, so as to make sure that they continue along their path on conveyer belt 5 in the desired horizontal direction and in safe abutment with and onto the upper surface of the belt 5.

Figure 6:
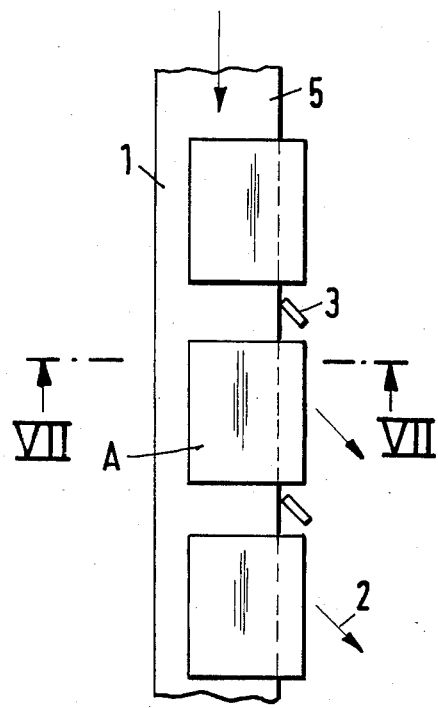
FIG. 6 is a different conveyer system with diverting wheels arranged next to the primary conveyer.
Figure 7:
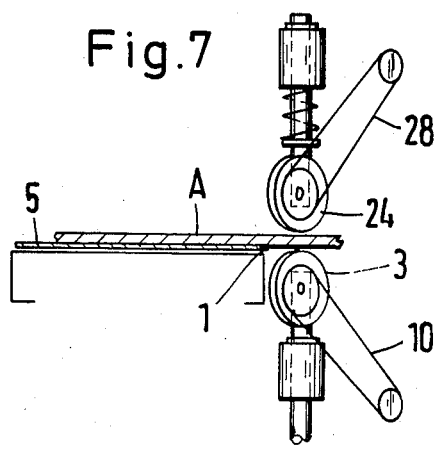
FIG. 7 is a section view as indicated by lines VII—VII in FIG. 6.

The example shown in FIGS. 6 and 7 are of the type in which a relative large and bulky articles and pieces of freight are to be moved and it is assumed that the goods such as A are not centrally disposed on the conveyer 1 but laterally overhung and projected beyond the belt 5. In this case then there is no interruption in the horizontal arrangement of the belt 5 because the diverting wheels 3 are not arranged within the conveyer 1 but right next to it. The diverting wheels 3 therefore, when rotated, engage whatever portion of the goods A projects laterally beyond the belt 5 to shift the goods along the direction of arrow 2 indicating a particular branch conveyer. Therefore these wheels 3 shift in fact the goods into the branch line whereby it may be advisable to use overhead friction wheels 24 as shown with reference to FIGS. 7 and 3 in order to avoid that in case of very light goods the diverting wheel or wheels merely lift the goods without imparting a lateral diverging movement upon them.

Figure 8:
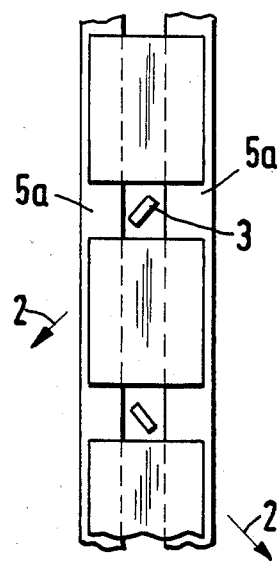
FIG. 8 is a top elevation of a conveyer system wherein the principal conveyer is longitudinally biparted.

FIG. 8 is an example in which the principal conveyer is biparted in longitudinal direction i.e. there are two conveyers 5a and 5a' being arranged side by side and they run in parallel. This then leaves the central portion between the two belts 5a and 5a' unoccupied and this particular space is suitable for accomodating the diverting wheels 3. In this case and depending upon the pivoting of the wheels 3 it is again possible to shift the goods to the left or to the right of the principal conveyer.

The invention is not limited to the embodiments described above but all changes and modifications thereof, not constituting departures from the spirit and scope of the invention, are intended to be included.

I claim:

1. In a conveyer system which includes a primary or main conveyer and a plurality of branching conveyers for diverting pieces of freight or other goods or articles from the primary or main conveyer towards different destinations and in different directions from the main conveyor the improvement comprising:
   a plurality of diverting wheels associated with and juxtaposed to a location from which a branch conveyer branches from said main or primary conveyer, the diverting wheels each having a vertical axis:
   first means including a plurality of vertically oriented shafts each provided for being individually mounted for up and down movement and each being provided for mounting a respective one of said diverting wheels so that upon turning of the shafts the wheels are pivoted about the vertical axes for selective diversion to one or the other side from the main conveyor; upon vertical displacement of the shafts, the wheels and vertically displaced individually, said first means further including a common lever arm extending horizontally from said shafts for pivoting said shafts in unison on the respective vertical axes;
   a plurality of cam means each including a laterally displaceable concave cam contour defining element cooperating with a respective feeler cam on said first means such that upon horizontal displacement of said cam means said lever first causes all said vertical shafts to pivot and be raised or lowered individually; and
   means for moving said cam means in a horizontal direction to obtain said pivot and lifting motion.

2. The improvement as in claim 1 each of said vertical shafts being connected to a horizontally extending pivot shaft there being coupling means for interconnecting ends of said pivot shafts for common actuation.

3. The improvement as in claim 2 said common actuation provided by said means for moving and including a lever for displacing said coupling means and a drive for pivoting said lever.

4. The improvement as in claim 3 wherein said lever has a pivot mount, a first point of linkage to said drive and a second point of linkage to that coupling means, said pivot and said first and second point establishing a triangle.

5. The improvement as in claim 1 wherein said main or principal conveyer includes an endless belt; means in each branch point forming a belt loop extending down from a normal plane of conveyer, said diverting wheels being situated inside said loop.

6. The improvement as in claim 5 and including belt means for extracting from said main conveyer drive motion for each of said diverting wheels.

7. The improvement as in claim 6 and including friction means disposed above said diverting wheel for urging goods or freight in down direction towards said diverting wheel.

8. The improvement as in claim 7 said friction means including friction wheels being mounted with resilient bias.

9. The improvement as in claim 1, wherein the feeler cam is mounted at an end of the lever arm.

10. The improvement as in claim 1 wherein said main or primary sonveyer is biparted, the diverting wheels being arranged in between.

11. The improvement as in claim 1, said diverting wheels being arranged alongside said main or primary conveyer.

* * * * *